Figure 1A:
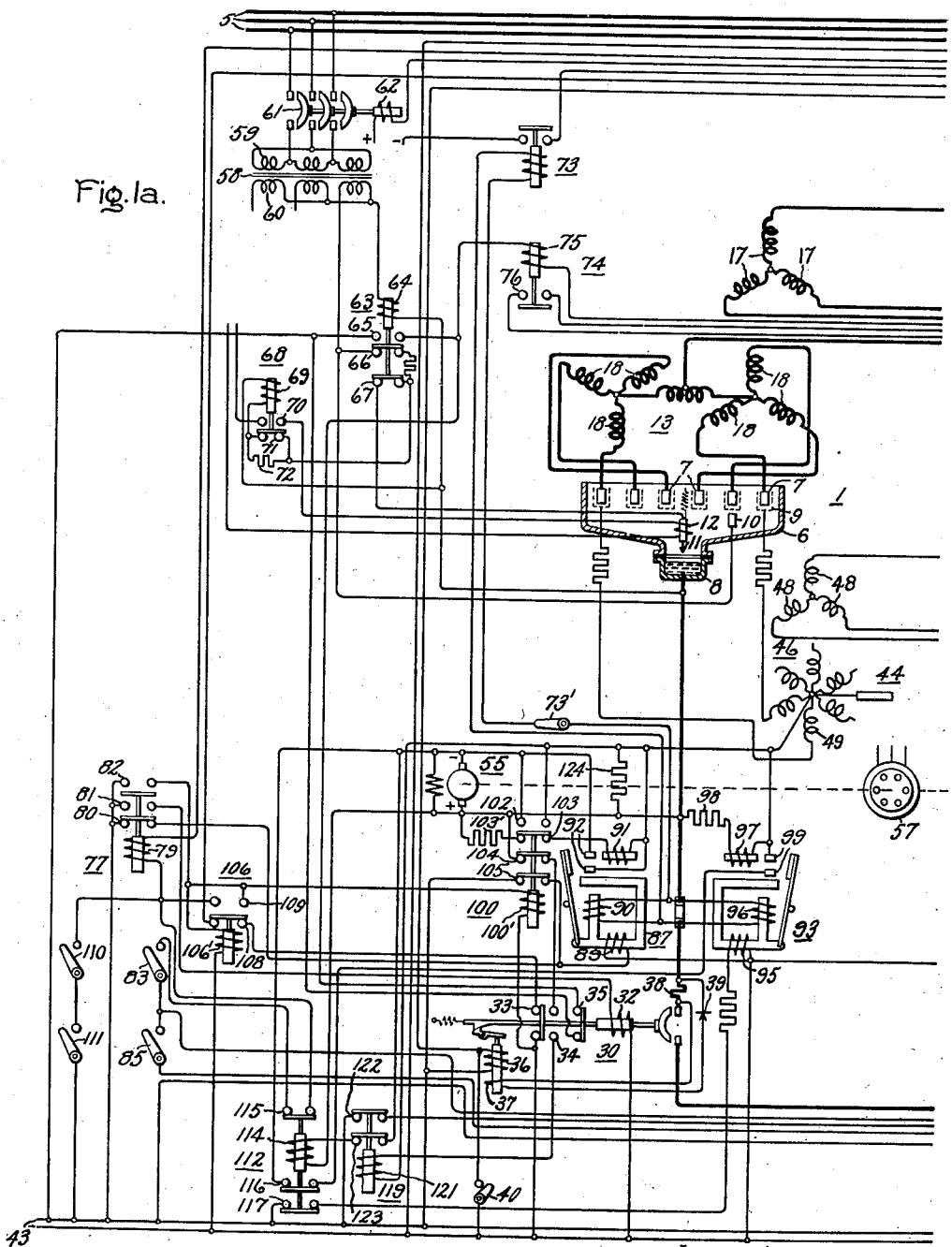

Dec. 28, 1943.   D. C. HOFFMANN ET AL   2,338,037
CONTROL SYSTEM FOR ELECTRIC VALVE APPARATUS
Filed Jan. 11, 1940   6 Sheets-Sheet 1

Inventors:
Daniel C. Hoffmann,
Eugene H. Reid,
Herman Bany,
by Harry E. Dunham
Their Attorney.

Inventors:
Daniel C. Hoffmann,
Eugene H. Reid,
Herman Bany,
by Harry E. Dunham
Their Attorney.

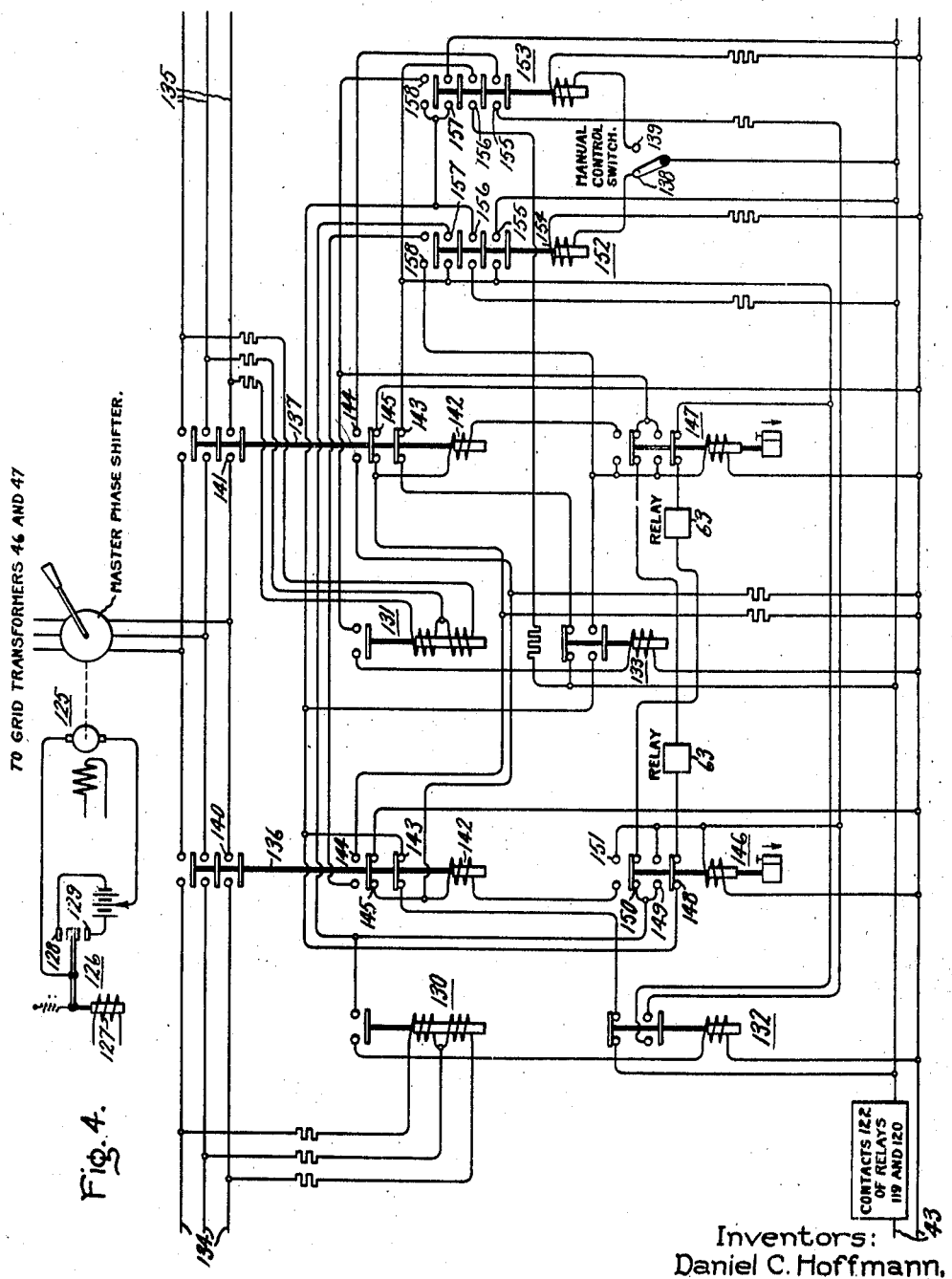

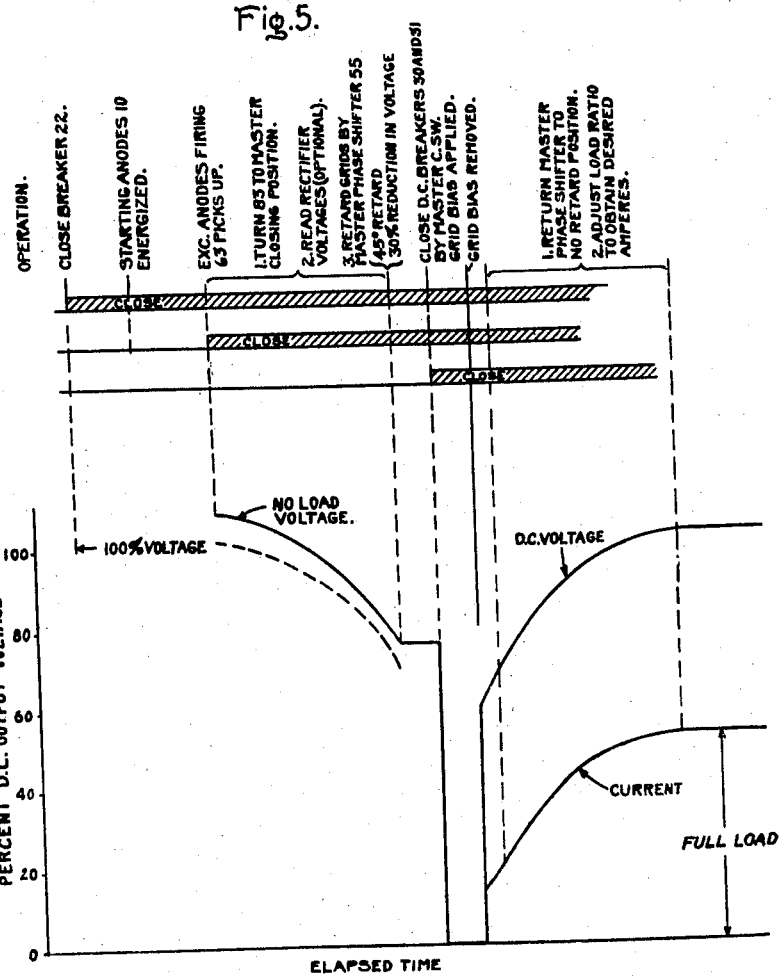

Inventors:
Daniel C. Hoffmann,
Eugene H. Reid,
Herman Bany,
by Harry E. Dunham
Their Attorney.

Patented Dec. 28, 1943

2,338,037

UNITED STATES PATENT OFFICE 2,338,037

CONTROL SYSTEM FOR ELECTRIC VALVE APPARATUS

Daniel C. Hoffmann, Yeadon, Pa., Eugene H. Reid, Schenectady, N. Y., and Herman Bany, Lansdowne, Pa., assignors to General Electric Company, a corporation of New York Application January 11, 1940, Serial No. 313,384

44 Claims. (Cl. 175—363)

Our invention relates to electric valve apparatus and more particularly to a control and protective system for electric valve power apparatus.

Electric valves translating apparatus of the type employing ionizable mediums, such as mercury vapor, have been found exceedingly satisfactory for supplying direct current from an alternating current supply circuit. In many applications, in order to meet the load current requirements, it is necessary to operate groups or units of electric valves in parallel. While arc-backs are infrequent, it is nevertheless necessary to provide control equipment to extinguish or suppress the arc-backs on the faulty equipment and at the same time restore service as soon as possible. In accordance with the teachings of our invention described hereinafter, we provide a new and improved control system for electric valve apparatus whereby a plurality of electric valves may be operated in parallel and whereby continuity of service is maintained or restored within a very short interval of time after the occurrence of an arc-back.

It is an object of our invention to provide new and improved electric valve translating apparatus.

It is another object of our invention to provide new and improved control apparatus and methods for operating a plurality of electric valve means in parallel relation between an alternating current circuit and a direct current circuit.

It is a further object of our invention to provide new and improved arc-back and overload-current protection for electric valve means.

It is a still further object of our invention to provide new and improved control apparatus for determining the sequence of operation of arc-back and overload protective apparatus associated with electric valve translating equipment.

Briefly described, in the illustrated embodiment of our invention we provide a control and protective system for a plurality of electric valve means which are operated in parallel relationship whereby a faulty electric valve means of the group may be temporarily isolated from the load circuit, and whereby the remaining electric valves may be automatically placed in operation within a short time after the occurrence of the disturbance or fault, or whereby the load transmitted by the normal electric valve means may be temporarily reduced and restored within a predetermined time.

Figure 1B:
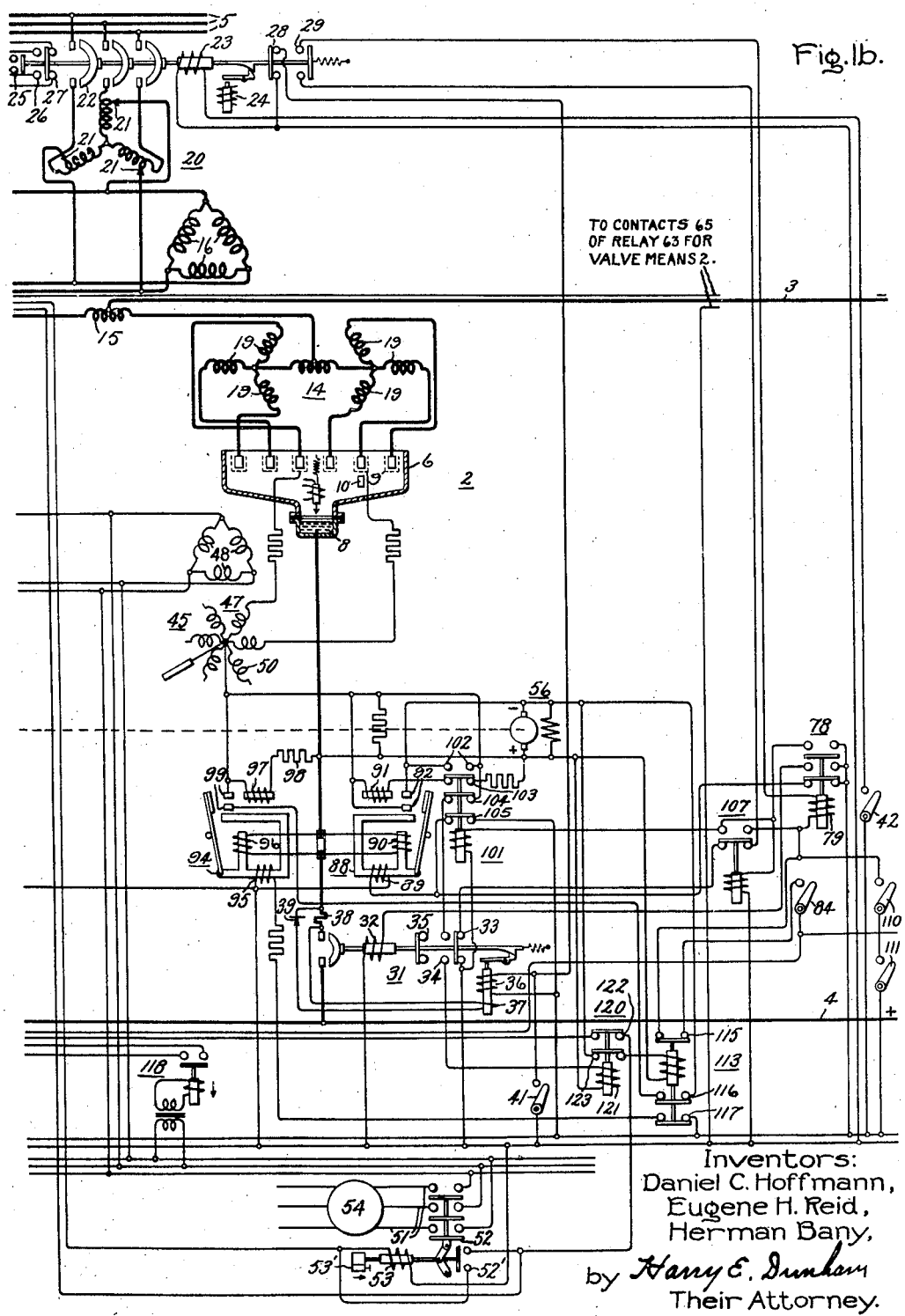
Figure 3:
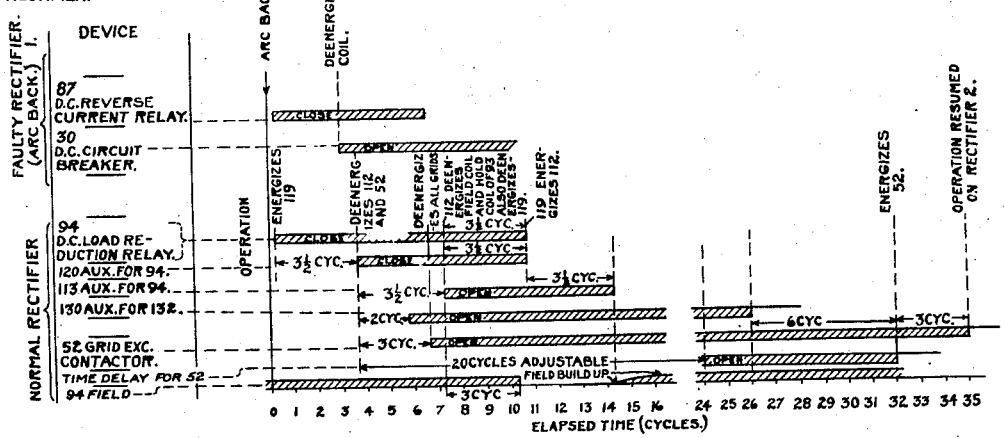
Figure 2:
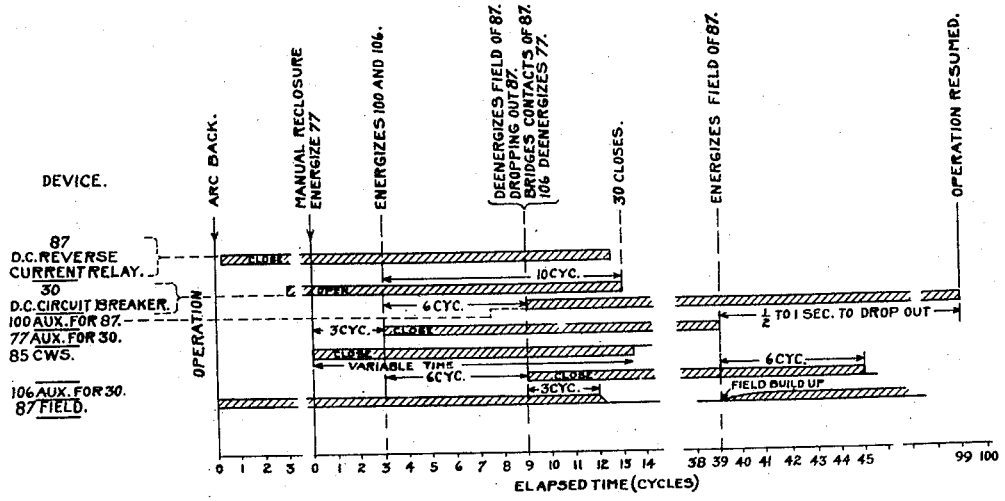
Figure 6:
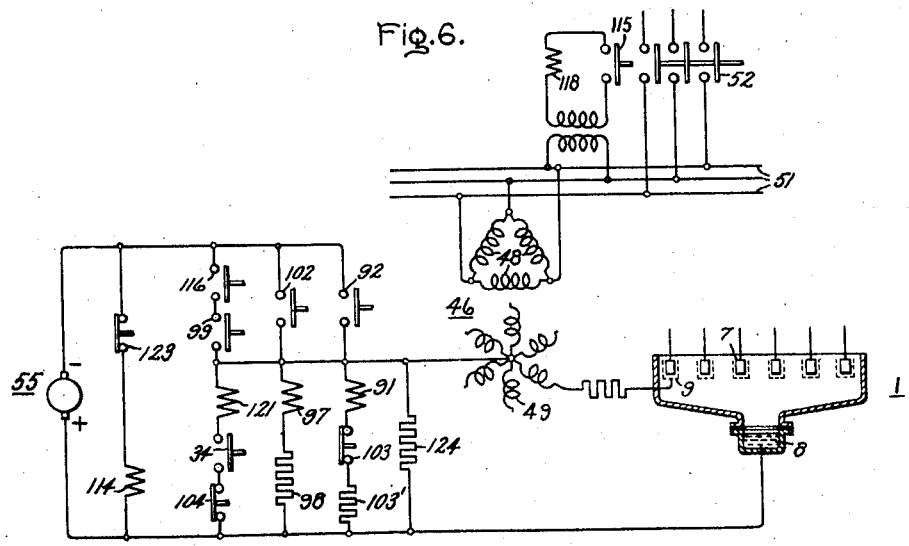
Figure 7:
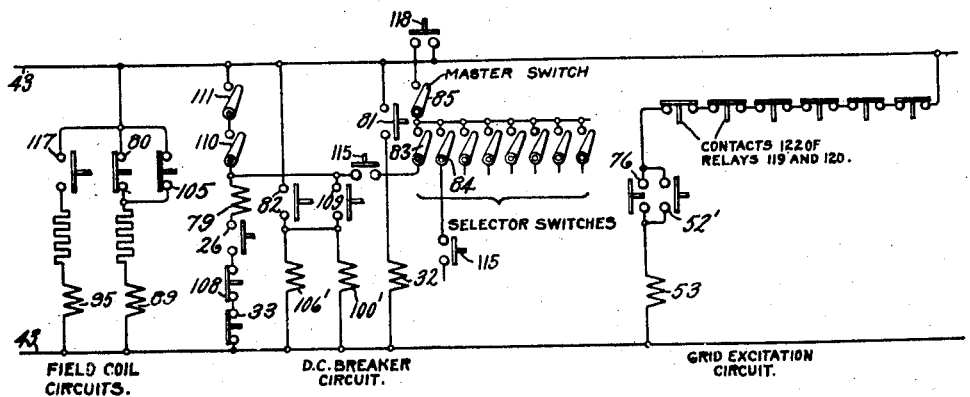

For a better understanding of our invention, reference may be had to the following description taken in connection with the accompanying drawings, and its scope will be pointed out in the appended claims. Figs. 1a, 1b and 4, considered together, diagrammatically illustrate an embodiment of our invention as applied to an electric valve system comprising a plurality of rectifier units for energizing a direct current load circuit from a polyphase alternating current supply circuit. Figs. 6 and 7 diagrammatically illustrate, in a simplified manner, certain aspects of the control system, and Figs. 2, 3 and 5 represent certain operating characteristics of the system.

Referring now to Figs. 1a and 1b, these drawings may be considered together to constitute a section of a group of electric valve means employed to energize a direct current circuit from an alternating current circuit. For example, the left-hand electric valve means 1 and the right-hand electric valve means 2 are arranged to operate as a section in parallel relationship to energize a direct current load circuit, comprising conductors 3 and 4, from a polyphase alternating current supply circuit 5. Each of the electric valve means 1 and 2 constitutes a rectifier unit and may be of similar construction and arrangement. For the purpose of facilitating the description and the operation of the system, only one of the electric valve means, such as electric valve means 1, will be described and shown in detail. The electric valve means 1 is of the type employing an ionizable medium and may comprise a plurality of arc discharge paths enclosed within a single receptacle or tank 6 and may comprise a plurality of anodes 7, a mercury pool cathode 8 and a plurality of control members or grids 9 arranged to control the time of initiation of the arc discharges between the associated anodes and the cathode. The electric valve means 1 also includes a plurality of holding anodes 10, only one of which is shown, and also includes means for striking or initiating an arc within the tank 6. This arc initiation means may comprise an ignition or striking electrode 11 spring-biased away from the mercury pool cathode 8 and may comprise an actuating coil 12 which when energized moves the electrode 11 into contact with the cathode 8.

The electric valve means 1 and 2 are connected to be energized from the alternating current supply circuit 5 through inductive networks 13 and 14, respectively. The inductive networks are interconnected through an interphase transformer 15 which is connected to conductor 3 of the direct current circuit. The inductive networks 13 and 14 also include a plurality of primary windings 16 and 17, and secondary windings 18 and 19, respectively. The groups of secondary windings 18 and 19 may be connected in a quadruple-Y connection.

A suitable voltage or load controlling means, such as an autotransformer 20 having adjustable taps 21 may be connected to the primary windings 16 and 17 to control the voltages impressed thereon and hence to control the output voltage of the electric valves 1 and 2 for a particular setting of the grid control apparatus explained hereinafter.

We employ a suitable switching means, such as a circuit breaker 22, connected between the supply circuit 5 and the transformer 20. The switching means 22 may be spring biased to the open circuit position and arranged to be locked in the closed position, and comprises a closing coil 23, a trip coil 24 and a plurality of auxiliary contacts 25–29 inclusive. We also provide a plurality of individual direct current switching means or circuit breakers 30 and 31 associated with electric valve means 1 and 2, respectively. The direct current circuit breakers 30 and 31 may also be spring biased to the open circuit position and arranged to be locked in the closed circuit position. These circuit breakers are similar in construction and arrangement and only one of these breakers, such as breaker 30, will be considered in particular. The breaker 30, for example, comprises a closing coil 32 and a plurality of auxiliary contacts 33–35, inclusive. The circuit breaker 30 is also provided with a trip coil 36 and an additional trip coil 37 which is responsive to arc-back or reverse current flow through the associated electric valve means 1. The trip coil 37 may be energized from a shunt 38 connected in series relation with the electric valve means 1 and through a suitably poled unidirectional conducting device 39. Manually operable means, such as switches 40 and 41, may be associated with trip coils 36 of circuit breakers 30 and 31 to open these breakers. Furthermore, a means such as a switch 42 may be associated with the closing coil 23 for energizing the closing coil of circuit breaker 22. The control apparatus for the system described may be energized from a suitable auxiliary source of current such as a circuit 43.

We provide grid excitation circuits 44 and 45 for electric valve means 1 and 2, respectively. These excitation circuits include suitable phase shifting means, such as rotary phase shifting devices 46 and 47, comprising primary windings 48 and secondary windings 49 and 50, respectively. The phase shifting devices 46 and 47 may be energized from an auxiliary source of alternating current 51 through a switching means 52 having an operating coil 53. A suitable master phase shifter, such as a master rotary phase shifter 54 is connected to control simultaneously the phase of the voltages impressed on the grids 9 of electric valve means 1 and 2, while the individual phase shifting devices 46 and 47 permit independent adjustment of the phase of the grid voltages of each rectifier. The circuit for effecting energization of the master phase shifter 54 is shown and described in detail in connection with Fig. 4.

The grid excitation circuits 44 and 45 include suitable sources of negative unidirectional biasing potential and these sources may comprise direct current generators 55 and 56, respectively. The generators 55 and 56 may be driven by a common means such as an alternating current induction motor 57.

The electric valve means 1 and 2 are each provided with an arc striking and holding anode circuit. However, only the excitation and holding circuit for the electric valve means 1 is shown in detail, and it is to be understood that a similar circuit is associated with electric valve means 2. The arc striking and excitation circuit for electric valve means 1 comprises a transformer 58 having a plurality of primary windings 59 and a plurality of secondary windings 60 which may be connected in Y. Only one of the windings 60 is shown as being connected to an associated holding anode 10. A suitable switching means 61 is employed to connect the transformer 59 operatively in the system and comprises an actuating coil 62 which maintains the switching means 61 closed so long as it is energized.

In order to supply energizing current to the striking electrode 11 when the mercury vapor of the electric valve means 1 is nonionized, we employ a suitable relay means 63 having an actuating coil 64 and contacts 65–67, inclusive. The actuating coil 64 is connected to the neutral connection of windings 60 and in series relation with the holding anode 10 and effects energization of the striking electrode 11 when the mercury vapor is nonionized. When the relay means 63 is energized, contacts 66 and 67 are open and contacts 65 are closed. To effect the desired energization of the actuating coil 12 associated with the striking electrode 11 in response to the condition of ionization of the mercury vapor of electric valve means 1, we employ an auxiliary relay 68 having an actuating coil 69 and contacts 70 and 71. When the closing coil 62 of the switching means 61 energizes the excitation transformer 58, the auxiliary relay 68 is energized and seals itself in through the resistance 72 connected across the contacts 71 thereof. Contacts 70 energize the arc striking coil 12, causing the striking electrode 11 to be dipped into the mercury pool cathode against the action of the spring biasing means. The actuating coil 69 is thereby shunted and the auxiliary relay 68 is deenergized, that is, drops out. When the arc striking electrode 11 is pulled away from the mercury pool by the action of the spring an arc is established and is immediately transferred to the holding anode 10. The neutral current from the holding anodes energizes coil 64 of relay 63 which opens the circuits for coil 69 to prevent further operation.

If the holding arc is extinguished, relay 63 becomes deenergized, effecting closure of contacts 66 and 67, and the above described operation will be repeated to supply current to the arc striking electrode 11 and to effect energization of the operating coil 12. By disconnecting the arc striking and excitation circuit after the starting operation, the overall efficiency of the system is substantially increased.

When it is desired to maintain the excitation circuit and the holding anode circuit in operation only when it is needed, that is, when the mercury vapor becomes deionized or when load current is not sufficient to maintain ionization of the mercury vapor, we employ a suitable relay means 73 which operates as an under-current relay. That is, the relay contact closes when the anode-cathode current of the electric valve means decreases to zero or to a very small value, indicating that the electric valve means I is liable to become no longer conductive. When the anode-cathode current decreases to a sufficiently small value, the relay 73 closes its contacts effecting energization of the closing coil 62 of the switching means 61 and thereby initiating the operation of striking and holding an arc within the electric valve means I. A suitable means, such as a switch 73', may be connected in circuit with the actuating coil of relay 73 for opening the coil of relay 73 so that the arc striking and the arc holding circuits will always remain effectively connected to the electric valve means I. In this case it will be understood that the actuating coil of relay 73 is always deenergized and its contacts are always closed effecting continuous energization of the excitation transformer 58.

As explained above, electric valve means 2 is also provided with an arc striking and holding anode circuit. In the starting sequence explained hereinafter, it is desired to determine, prior to the closure of the direct current breakers 30 and 31, whether the electric valve means I and 2 are in condition for operation, that is whether or not the mercury vapor of the respective electric valve means is in an ionized condition. Accordingly, we provide a relay 74 having an actuating coil 75 and contacts 76 and which is responsive to the state of ionization of the mercury vapor of each of the electric valves. The actuating coil 75 of relay 74 is connected in series relation with contacts 65 of all the relays 63. Contacts 76 of relay 74 are connected in series relation with closing coil 53 of circuit breaker 52 to assure that the electric valve means I and 2 are ionized prior to the closure of the switch 52. When switch 73' is closed, relay 63 drops out relay 75 which in turn opens switching means 52.

With switch 73' closed, relays 63 would tend to drop out relay 74 which would open switch 52. We, therefore, provide a circuit including auxiliary contacts 52' to seal around contacts 76 of relay 74. It is important to provide some time delay before permitting the closure of the grid excitation contactor 52, and the reason for this time delay is to give relays 63, in series with the holding anode circuits, an opportunity to drop out if for any reason the holding-arcs should fail on the rectifiers at that time. Hence, we provide a suitable time delay means which will effect closure of the contactor 52 with the desired delayed action. This time-delay means may be a dash-pot 53', as illustrated, or other suitable apparatus. When the control circuit for grid excitation shown in Fig. 4 is employed, the relays 146 and 147 described hereinafter serve this purpose and the dash-pot 53' and contacts 52' need not be employed.

As a means for initiating closure of the direct current circuit breakers 30 and 31, we provide a plurality of initiating or control circuits including relays 77 and 78, each comprising a coil 79 and contacts 80—82. Manually operable selector switches 83 and 84 are connected in series relation with the coils 79 and a master switch having contacts 85 is also connected in series relation with the coils 79. The master switch, comprising contacts 85, is arranged to be spring biased to the open circuit position, effecting energization of coil 79 only so long as it is under manual control of the operator. It will be noted that auxiliary contacts 26 of circuit breaker 22 are also connected in series relation with coil 79 of electric valve means I to prevent closure of circuit breaker 30 until the alternating current breaker 22 is closed. Contacts 29 of circuit breaker 22 are interconnected with relay 78.

We provide reverse current relays 87 and 88 associated with electric valve means I and 2, respectively, for impressing on the grids 9 of electric valve means I and 2 negative unidirectional biasing potentials to suppress or extinguish the arc when the respective electric valve means arc-back or conduct current in the reverse direction. The reverse current relays 87 and 88 each include a field coil 89, a control coil 90, a holding coil 91 and a pair of contacts 92. The contacts 92 connect the negative terminals of the direct current generator 55 and 56 to the neutral connections of the phase shifting devices 46 and 47.

We also provide current responsive relays 93 and 94 each including a field coil 95, a control coil 96 and a holding coil 97 which is connected to the cathodes of the associated electric valve means through a resistance 98. Current responsive relays 93 and 94 are also provided with a pair of contacts 99 which also operate to impress on the grids 9 negative unidirectional biasing potentials sufficient in magnitude to maintain the electric valve means nonconductive, and also to initiate the circuit controlling operations to place the electric valve means in condition for operation a predetermined interval of time after the occurrence of an arc-back condition on another of the electric valves or after the occurrence of an overload condition.

To supplement the action of the reverse current relays 87 and 88, we provide a pair of auxiliary relays 100 and 101. These relays impress the negative biasing or hold-off voltages from generators 55 and 56 on grids 9 of electric valve means I and 2 during the resetting operation of reverse current relays 87 and 88. These relays comprise contacts 102–105, inclusive. Relays 106 and 107 are employed to control the energization of the coils 100' of relays 100 and 101 and also to provide an interlocking circuit for coils 79 of relays 77 and 78 and the circuit breaker 22. Contacts 108 of relay 106 are connected in series relation with auxiliary contacts 33 of circuit breaker 30 and auxiliary contacts 26 of circuit breaker 22; and contacts 109 of relay 106 are connected in series relation with the actuating coil of relay 100 through switches 110 and 111. These switches permit manual and selective closure of the individual circuit breakers 30 and 31 when desired.

In order to predetermine or test the existence of sufficient negative unidirectional biasing potential and the presence of a satisfactory alternating current voltage for energizing the grids 9 of electric valve means I and 2, we provide relays 112 and 113, respectively. Each of these relays comprises an actuating coil 114 and contacts 115—117. The relay 112 is responsive to the armature voltage of the generator 55 since the coil 114 is connected to be energized therefrom, and when the magnitude of the biasing voltage is sufficient contacts 115 are closed to complete a circuit to permit energization of coil 79 of relay 77 only when biasing voltage is available. The presence of alternating grid control voltage is checked by means of an alternating current relay 118, the contacts of which are connected in series relation with selector switch 83, master switch 85 and contacts 115 of relay 112. If desired, relay 118 may be provided with a plurality of pairs of contacts each connected in series relation with the associated selector switch for a different rectifier unit. For example, an additional set of contacts may be provided on relay 118 to be connected in series relation with selector switch 84 for electric valve means 2. Contacts 105 of relay 100 are connected to control the energization of the field coil 89 of the reverse current relay 87, and contacts 117 of relay 112 control the energization of the field coil 95 of the relay 93. Relays 112, 113 and relay 118 thereby prevent closure of the direct current breakers unless grid bias voltage and alternating grid voltage are available.

We provide relays 119 and 120 having an actuating coil 121 and contacts 122 and 123 to control operation of circuit breaker 52 at the desired time during the protective and reclosing operation. Contacts 122 are connected to the auxiliary circuit 43 and in series with actuating coil 53 of switch 52 to close switch 52 when predetermined conditions are established for starting the system, and to open switch 52 and thereby remove alternating grid voltage upon the occurrence of an arc-back or overload condition. Contacts 123 are connected in series relation with coil 114 of relay 112 across the armature of generator 55. A resistance 124 is employed as a loading resistance for the grid circuit and to permit biasing of the grids; otherwise the grid circuit would be open or when the relay operates the bias generator would be short-circuited.

The operation of the embodiment of my invention shown in Figs. 1a and 1b will be explained by considering the system when it is intended to operate as a rectifying system for energizing the direct current circuit, including conductors 3 and 4, from the alternating current circuit 5. The electric valve means 1 and 2 are connected to operate in parallel to energize the direct current circuit. The alternating current circuit breaker 22 is moved to the closed circuit position by closing switch 42 which energizes the closing coil 23. Upon the closure of circuit breaker 22, auxiliary contacts 25 are also closed effecting energization of the closing coil 62 of switching means 61, thereby connecting the excitation transformer 58 to supply circuit 5. Relay 73, being an undercurrent relay, is in the closed circuit position. Current will be transmitted to the arc striking electrodes 11 and those elements will be moved into engagement with the mercury pool cathode to establish an arc discharge. Of course, it is to be understood that an arc discharge is established as the electrode is moved away from the cathode by means of the spring. As soon as the arc is established it will be transferred to the holding anode 10. Upon the flow of current in the neutral connection of the secondary windings 69 of transformer 58, relay 63 is energized. If the holding arc is extinguished, relay 63 will drop out and the arc will be re-initiated. With switch 73' in the closed circuit position, relay 73 will be picked up to interrupt the energization of transformer 58 so that the arc striking and holding anode circuits are effectively connected only when those circuits are required. If the load is dropped by the electric valve means 1, relay 73 will be closed and the arc striking circuit and the holding anode circuit will be energized.

The direct current circuit breakers 30 and 31 may be closed in the following manner. The master switch associated with contacts 85 is closed and those contacts are maintained closed only so long as the operator holds the switch closed. Of course, selector switches 83 and 84 are also moved to the closed circuit positions. Upon closure of switch 85, considering only the control associated with electric valve means 1, relay 77 is operated provided the alternating current circuit breaker 22 is closed and also provided that the armature voltage of generator 55 and the voltage of circuit 51 are of suitable magnitude. In this manner operation of the initiating circuit is prevented unless grid biasing voltage and alternating grid voltage are available. When relay 77 closes, contacts 82 pick up relays 106 and 100 which are sealed in through the control contacts 109 of relay 106. Relay 100 applies negative grid bias voltage to grids 9 of electric valve means 1 through the phase shifter 46, thereby constituting interlocking means for preventing the electric valve means from assuming load immediately upon the closure of circuit breaker 30. Contacts 81 of relay 77 upon closing effect energization of closing coil 32 of circuit breaker 30, and thereby close this breaker which is latched in the closed circuit position. The purpose of relay 106 is to provide an anti-pumping feature in the circuit breaker control. If for any reason the circuit breaker refuses or fails to close, the closing coil 32 will be deenergized by relays 77 and 106 and no further attempt will be made to close unless the operator releases and recloses the master control switch 85.

Contacts 27 and 28 of circuit breaker 22 constitute an interlocking means to trip the direct current breakers 30 and 31 in the event the alternating current breaker 22 is in the open circuit position. Of course, closure of the direct current breaker cannot be effected so long as the breaker 22 is open.

Upon closure of the master switch 85 the direct current breakers 30 and 31 will be moved to the closed circuit positions simultaneously. Just before the breakers 30 and 31 close, negative bias is applied automatically to all the grids, causing the direct current output voltage to drop to zero. Within a short definite interval of time after the operator releases switch 85, the negative grid bias will be removed automatically and all rectifiers will assume load. The application of the negative hold-off or bias voltage to the grids 9 is effected by means of the relays 100 and 101 which, through contacts 102, impress the negative voltages on the grids when in the closed positions. Relays 100 and 101 drop out after switch 85 is opened and after the circuit breakers are closed. Relays 77 and 78 were previously dropped out by contacts 108 and contacts 33. Accordingly, bias or hold-off voltage is maintained on the grids until after the closure of the direct current breakers 30 and 31.

The sequence of operation of relays 77, 78, 100 and 101 may be more fully described as follows. In the event switch 85 is held closed just sufficiently long to effect closure of relays 77 and 78 and is then released, it will be noted that these relays in picking up complete their sealing-in circuits through contacts 82 and coils 100', as shown in Fig. 7. In the meantime, both relays 100 and 106 are also picked up. However, when contacts 108 open, coil 79 is deenergized but due to the delay in drop-out of the relay, sufficient time is allowed to permit the desired energization of closing coil 32 thereby insuring complete closure of the circuit breaker. At the expiration of the time delay of relay 77, its contacts open the circuits of the coils of both 100 and 106 thereby causing these devices to drop out. Hence, grid bias is thus removed automatically by the actual closing of the circuit breaker through its control relays.

However, in the event switch 85 is held closed until after the circuit breaker 30 latched in and after relay 77 has automatically dropped out, then coils of 100 and 106 will remain energized from contacts 85 as long as the contacts are held closed. As soon as these contacts are released, the coils then become deenergized and grid bias is removed from the rectifier.

Our system operates to protect the electric valve apparatus from arc-backs and overcurrent conditions occasioned by arc-back. For example, when a group of electric valves are operated in parallel relation to energize a direct current circuit from an alternating current supply circuit, an arc-back on one of the electric valve means causes reverse current to flow through that electric valve means and also imposes an overload condition on the other electric valves. We have found that it is desirable to isolate the electric valve means which arcs back by disconnecting the direct current circuit from that electric valve means and to reduce the load transmitted by the other electric valve means. Of course, it is to be understood that the load on the other electric valve means may be dropped entirely.

Referring more particularly to the operation of our system under arc-back conditions, the electric valve means which arcs back is controlled by impressing on the grids thereof a relatively large negative biasing voltage for arc suppression and the individual associated direct current breaker is opened. The other electric valve means are not disconnected from the system but are made to drop or decrease load by impressing on the grids thereof a sufficiently negative voltage to maintain the valve non-conductive for a predetermined interval of time or to reduce the current conducted during a certain interval. The system automatically responds to remove the bias grid voltage from those electric valve which have not been subjected an an arc-back condition and accordingly the load is assumed by the other electric valve means of the system in a short interval of time.

The operation of the system under an arc-back condition of one of the electric valve means will be first described. The protection against arc-back and overcurrent is provided by the high speed relays 87, 88 and 93, 94, respectively. The sequence of operation shown in Fig. 2 will also be referred to in order to facilitate description of the operation of the various elements involved. When one of the electric valve means, such as electric valve means 1, arcs-back, it is desirable to disconnect that electric valve means from the direct current circuit and to reduce the load transmitted by electric valve means 2 and subsequently to restore the operation of electric valve means 2. Upon the occurrence of reverse current flow through electric valve means 1, control coil 90 of the reverse current relay 87 is energized, effecting closure of contacts 92 and applying the negative biasing voltage to grids 9 through the windings of the phase shifting device 46. This operation suppresses the arc from the electric valve means 1. The reverse current flow through the shunt 38 and unidirectional conducting device 39 energizes trip coil 37 and opens the direct current circuit breaker 30. Holding coil 91 holds contacts 92 closed. The negative biasing voltage is applied to the grids 9 until the operator recloses circuit breaker 30 by operation of switch 85. Referring to Fig. 2, when the operator recloses switch 85, relay 77 is closed energizing the actuating coil of relay 100. Contacts 80 of relay 77 open at this time, and contact 82 picks up the auxiliary relay 100. The contacts 102 of auxiliary relay 100 shunt the contacts 92 of relay 87 to hold the negative bias during the resetting operation of relay 87. Contacts 103 of relay 100 deenergize the holding coil 91 of relay 87, and contact 105 opens the field coil 89 of relay 87. When relay 77 drops out after closing circuit breaker 30, the field coil 89 of relay 87 is reenergized. Relay 100 will not drop out until the operator releases switch 85. When this is done, relay 100 drops out and its contacts 102 remove negative bias from the grids. The electric valve rectifier then picks up load immediately.

If the electric valve means 1 is not defective and if the system is otherwise in condition for operation, the operator may reconnect the electric valve means 1 to the direct current circuit. This operation is shown in Fig. 2 and may be explained in the following manner: Upon operation of the control switch 85, relay 77 is operated to close circuit breaker 30. The field coil 89 of the reverse current relay 87 is deenergized by contacts 105 of relay 100. When relay 100 picks up, contacts 102 thereof apply a negative biasing potential to the grids 9 to maintain the electric valve means 1 nonconductive during the resetting operation of the relay 87. When contacts 103 are open, the holding coil 91 of reverse current relay 87 is deenergized thereby opening the contacts 92. When relay 77 drops out after closing circuit breaker 30, the field coil 89 of relay 87 is reenergized thereby placing it in operative condition. Relay 100 will not drop out until the operator releases switch 85. When this is done relay 100 drops out and its contacts 102 remove the negative biasing voltage from grids 9. The electric valve means 1 then assumes its proportionate load immediately.

As stated above, it is desired in many instances to place the normal rectifiers, which have not arced-back, in operation immediately after the occurrence of an arc-back on another rectifier. This aspect of the operation of the system will be explained with reference to Fig. 3 and by considering the system upon the occurrence of an arc-back condition on electric valve means 1. The negative biasing voltage will, of course, be applied to grids 9 and the direct current circuit breaker 30 will be opened. Concurrently with the occurrence of the arc-back condition of electric valve means 1, electric valve means 2 will be subjected to an overload condition and accordingly its current relay 94 will be operated to close its contacts 99. Upon closure of contacts 99, a negative bias voltage from generator 56 is applied to the grids 9 of valve means 2, thus suppressing the arc and causing electric valve means 2 to drop its load. Relay 120, which is energized through contacts 104 of relay 101, interlock contacts 34 of circuit breaker 31, contacts 99 of relay 94 and contacts 116 of relay 113, picks up immediately.

Contacts 122 of relay 120 open the circuit of coil 53 of switch 52, thereby removing alternating current grid excitation from the electric valve means 1 and 2. Contacts 123 of relay 120 cause deenergization of relay 113, and contact 122 of relay 120 deenergizes coil 83. Field coil 95 of the current relay 94 is deenergized by opening of contacts 117 of relay 113 and the negative biasing voltage is removed from the grids 9 by contacts 116 of relay 113. The electric valve means 2 does not assume the load immediately inasmuch as the alternating current excitation is not yet applied. When relay 120 drops out its contacts 123 pick up relay 113 completing the resetting operation of relay 94 by energizing its field coil 95. As relay 120 drops out it energizes coil 53 of switch 52 and reapplies the alternating grid voltage to grids 9. The equipment is then ready for another operation.

When relay 120 drops out in the above described resetting sequence, its contacts reestablish the circuits for the alternating current grid excitation circuit. If the electric valve means 1 and 2 have been operated with holding anode excitation on continuously, the operation may be obtained by opening switch 73'. Grid excitation will be reapplied as soon as relays 120 have dropped out.

The electric valve means 1 and 2 may be operated with holding anode excitation under automatic control. This operation may be obtained by closure of switch 73'. Alternating current grid excitation will be reapplied as soon as relays 119 and 120 have dropped out and provided all the holding arcs have been reestablished. The presence of holding arcs is checked by relay 74. Since the contacts 65 of all the relays 63 are in series relation with coil 75 of relay 74, as soon as the arcs on all rectifiers with the exception of the one which has arced back have been reestablished, relay 74 picks up and permits energization of actuating coil 53 of switch 52, thereby reapplying alternating current grid excitation. It will be noted that auxiliary contacts 35 of the circuit breakers 30 and 31 are closed when the breakers are in the open circuit position, thereby shunting contacts 65 of relay 63. In this manner, the coils 75 of relay 74 may be energized even though the electric valve means 1, which has arced back, is not in condition for connection to the system. If any of the direct current breakers is open, the interlock including contacts 35 shunts the associated relay 63 to render it ineffective. Consequently, the electric valve means 2 will assume load.

It is emphasized that under an arc-back condition on one of the rectifying units the other rectifying units may be made to transmit a reduced load or may be controlled, as explained above, to drop load completely. In the former instance, the system may be operated so that the voltages impressed on the grids of the normal electric valves are retarded in phase, or the component of negative unidirectional biasing potential derived from the generators 55 and 56 may be of such a value to decrease the current conducted by the various electric valve means. For example, to obtain this reduction in load we may employ an arrangement for temporarily reducing the current conducted by the electric valve means, such as that described and claimed in United States Letters Patent 2,175,020 granted October 3, 1939, upon an application of Claus Fröhmer and which is assigend to the assignee of the present application.

Fig. 4 diagrammatically illustrates the grid excitation circuit for assuring energization of the grid circuits for electric valve means 1 and 2. The broad feature of employing a master phase shifter and means for selectively energizing the phase shifter from a number of control circuits is disclosed and broadly claimed in United States Letters Patent No. 2,220,735 granted November 5, 1940, on an application of Donald R. Smith and No. 2,215,325 granted September 17, 1940, on an application of Daniel C. Hoffmann, filed concurrently herewith and both assigned to the assignee of the present application. The grid excitation control circuit shown in Fig. 4 is arranged to be connected to primary windings 48 of grid excitation circuits 44 and 45 of the system shown in Figs. 1a and 1b. When the control circuit of Fig. 4 is employed, it is not necessary to employ the contactor 52, the function of this contactor being performed by the selective contactors, described hereinafter, which operate to assure energization of the grid excitation circuit in the event the voltage of a connected source fails. The master phase shifter may be adjusted manually or may be adjusted automatically by means of a suitable control device responsive to a predetermined electrical condition of the electric valve means 1, such as the direct current output voltage thereof. A suitable positioning means, such as a direct current motor 125, may be employed to control the angular displacement of the rotary phase shifter and to control thereby the phase of the voltage impressed on the grids 9 of electric valve means 1 and 2. We have shown diagrammatically a suitable relay 126 comprising an actuating coil 127 which may be connected to be responsive to the voltage of the direct current circuit and comprises contacts 128 and 129 which control the direction of the voltage applied to the armature of the direct current motor 125.

We provide two instantaneous undervoltage relays 130 and 131 to check the presence of normal three-phase grid supply voltage. Each of the relays 130 and 131 is provided with an auxiliary relay 132 and 133. The control is so arranged that the grids 9 of the electric valve means 1 and 2 is supplied either from the alternating current source 134 or 135. The system is arranged so that the grids 9 will be supplied from one source until that source fails or until the operator shifts over to the other source by means of the manual control switch having contacts 138 and 139.

We employ selective control contactors 136 and 137 which connect either source 134 or 135 to the master phase shifting device. The system is arranged so that the grids will be supplied from one source until that source fails or until the operator shifts over to the other source by means of the manual control switch. If the source in use fails, the master phase shifter will be disconnected instantly from that source and immediately connected to the other source without overlap. If the operator effects the change from one source manually by means of the control switch, the master phase shifting device is connected to the selected source before it is disconnected from the other source, with overlap, thereby assuring continuity of grid power.

Contactors 136 and 137 are provided with main contacts 140 and 141, respectively, and each comprises an actuating coil 142 and auxiliary contacts 143—145. We also employ auxiliary relays 146 and 147 for contactors 136 and 137, respectively. Relays 146 and 147 are provided with contacts 148—151. Selector control contactors 152 and 153 are employed as means for selectively connecting the grid circuits to either source 134 or 135. Contactors 152 and 153 each may comprise an actuating coil 154 and contacts 155—158.

The operation of the control system shown in Fig. 4 will be explained by considering the system when grid power is being supplied from source 134. Relays 130, 132, 146 and contactor 136 will be closed. Of course, contact 138 has previously been engaged momentarily to effect closure of contactor 152. If source 134 fails, relay 130 will open its contact and drop out relay 132 instantly. Relay 132 opens its lower contacts and drops out relay 146 and contactor 136. When contactor 136 drops out it disconnects the master phase shifter from source 134. Relay 146 drops out with a short definite time delay of about one second.

If power is available on source 135, relay 133 will be energized through the contacts of relay 131, contacts 150 of relay 147, contacts of relay 63, contacts 148 of contactor 146, contacts 143 of contactor 136, the upper contacts of relay 132 and contacts 122 of all relays 119 and 120. Relay 133 closes its lower contacts and energizes relay 147 which in turn energizes contactor 137. Contactor 137 connects the master phase shifting device 54 to source 135.

Upon failure of the connected source, the rectifiers will drop load momentarily, but load will be picked up when contactor 137 closes. The time interval that load is off will probably not exceed one second, depending upon the time delay on drop-out of relay 146.

If source 135 fails when it is supplying grid power, the equipment will operate to connect source 134 to the grid circuits in a manner similar to that described above for transferring from source 134 to source 135.

The operation of the control system will next be explained when the operator wishes to initiate manually the transfer from source 134 to source 135. Contact 139 of the manual control switch is engaged and held in the closed position for about one second. Contacts 157 and 158 of contactor 153 pick up relay 133, which closes its lower contacts and picks up relay 147. Relay 147 picks up contactor 137 which connects the master phase shifting device to source 135. At this time sources 134 and 135 are connected in parallel.

Contact 156 of contactor 153 shunts contacts 143 of contactor 137 and the upper contacts of relay 133 so that the opening of these contacts will not drop out contactor 136. As contact 155 of contactor 153 is closed, the coil 142 of contactor 136 will be shunted by contacts 144 of contactor 137 when 137 closes. The current is limited by the resistance shown in series with contact 156 of contactor 153. Contactor 136 drops out, disconnecting source 134. When the operator releases switch 139, the relays return to the normal positions.

The length of time that the two sources 134 and 135 are in parallel is very short, amounting to the time of drop-out of contactor 136 when its coil 142 is shunted by contact 144 of contactor 137. This time is approximately 0.05 second.

To transfer the grid circuit back to source 134, the operator moves the switch arm to engage contact 138 for about one second. The operation of the equipment is substantially the same as that explained above.

While the above description and operation have been explained in connection with an electric valve system comprising only two rectifier units, it will be understood that the system is applicable to a plurality of sections such as that shown in Figs. 1a and 1b combined. In connection with the method of operating a system of this nature, we have found that the system of starting shown in Fig. 5 may be employed:

A—The operator closes the alternating current circuit breakers 22 simultaneously or in a predetermined order by means of the master control switch comprising switches 42.

B—The holding arcs will be established automatically by means of the associated circuits described above.

C—The operator checks the direct current voltage on all rectifiers to determine that all holding arcs have been established.

D—The operator reduces the direct current voltage approximately 30% upon all units simultaneously before operation of the master phase shifter 54.

E—The operator closes all direct current breakers corresponding to circuit breakers 30 and 31 simultaneously by controlling the master switch 85. Just before these breakers close, negative bias voltage is applied automatically to all rectifier grids, causing the direct current voltage to drop to zero. Within a short interval of time after the operation by releasing the handle of the control switch connected with switch 85 the negative grid bias will be removed automatically and all rectifiers assume load.

F—After the rectifiers have assumed load, the automatic control including the motor 125 is permitted to assume control of the output voltage.

Fig. 6 is a simplified diagrammatical representation of the grid control circuit and the grid excitation circuit. The elements have been assigned reference numerals corresponding to the system shown in Fig. 1a.

Fig. 7 is also a simplified diagrammatic representation of certain circuits for the control system shown in Figs. 1a and 1b. This simplified diagram shows the control for the field coil circuits of the reverse current relay 87 and the over-current relay 93, the control circuits for the direct current circuit breaker 30 and the grid excitation circuit.

The plurality of switches including switches 83 and 84 may be mounted on a single control panel where a number of sections of rectifier units such as shown in Figs. 1a and 1b, are employed. The control panel there shown would be used with a station including four sections of two rectifiers each. It will be understood that by closing the selector switches 83 and 84, the switch 85 then operates as master control switch to initiate the operation of all those rectifiers which have been preselected by switches 83 and 84.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States, is:

1. In combination, an alternating current supply circuit, a direct current load circuit, electric translating apparatus connected between said circuits and comprising a plurality of electric valve means for transmitting power between said circuits and each having at least one control member for controlling the conductivity thereof, a plurality of individual direct current switching means for connecting said electric valve means to said direct current circuit, means selectively responsive to a reversal of power flow in said electric valve means for impressing biasing voltages on the control members to render said electric valve means nonconductive, means for opening the direct current switching means connected to the electric valve means which arcs back, and means for automatically removing said biasing potential from predetermined electric valve means a predetermined interval of time after the occurrence of the reversal of power flow.

2. In combination, an alternating current supply circuit, a direct current load circuit, electric translating apparatus comprising a plurality of electric valve means each constituting a rectifier unit for transmitting power to said direct current circuit and each having at least one control member for controlling the conductivity thereof, direct current switching means for connecting electric valve means to said direct current circuit, means responsive to the reversal of power flow in any one of said units for impressing biasing voltages on the control member of that unit and the control members of another unit to render said electric valve means nonconductive, means for opening the direct current switching means connected to the electric valve means which arcs back, and means for automatically removing said biasing potential from those electric valves which have not arced-back a predetermined interval of time after the occurrence of the reversal of power flow.

3. In combination, an alternating current circuit, a direct current circuit, electric translating apparatus comprising a plurality of electric valve means each having at least one control member for controlling the conductivity thereof, direct current switching means for connecting said electric valve means to said direct current circuit, means responsive to the amount of power transmitted by any one of said electric valve means for impressing control voltages on the control member of that electric valve means to reduce temporarily the power transmitted thereby, and means responsive to said last mentioned means for automatically modifying said control voltage to permit said one electric valve means to deliver power at normal voltage.

4. In combination, an alternating current supply circuit, a direct current load circuit, electric translating apparatus comprising a plurality of electric valve means each constituting a rectifier unit for transmitting power to said direct current circuit and each having at least one control member for controlling the conductivity thereof, direct current switching means for connecting said electric valve means to said direct current circuit, means responsive to the current transmitted by each of said units for impressing on the control member of that unit a biasing voltage to reduce the power transmitted py said unit, and means responsive to said last mentioned means for modifying said biasing voltage to increase the power transmitted by said unit a predetermined interval of time after the operation of said last mentioned means.

5. In combination, an alternating current supply circuit, a direct current load circuit, electric translating apparatus connected between said circuits comprising a plurality of electric valve means each constituting a rectifier for transmitting power to said direct current circuit and each having at least one control member for controlling the conductivity thereof, means selectively responsive to the reverse current conducted by said electric valve means for selectively rendering nonconductive that electric valve means which arcs back, and means for reducing the power transmitted by the other electric valve means.

6. In combination, an alternating current supply circuit, a direct current load circuit, electric translating apparatus connected between said circuits comprising a plurality of electric valve means each constituting a rectifier for transmitting power to said direct current circuit and each having at least one control member for controlling the conductivity thereof, a plurality of switching means each associated with a different one of said electric valve means for connecting the associated electric valve means to said direct current circuit, individual means each associated with a different one of said electric valve means for operating the associated switching means in response to reverse current, means for applying negative biasing potentials to render nonconductive the electric valve means which conducts reverse current, and means for impressing voltages on the control members of the other electric valve means to decrease the power transmitted thereby.

7. In combination, an alternating current supply circuit, a direct current load circuit, electric translating apparatus comprising a plurality of electric valve means each constituting a rectifier unit for transmitting power to said direct current circuit and each having at least one control member for controlling the conductivity thereof, alternating current switching means for connecting said translating apparatus to said supply circuit, direct current switching means for connecting said electric valve means to said direct current circuit, a source of current for energizing said control members, and means responsive to a predetermined electrical condition of said direct current circuit for impressing on said control members a hold-off voltage and for disconnecting said source from said control members.

8. In combination, an alternating current circuit, a direct current circuit, electric translating apparatus comprising a plurality of electric valve means each having at least one control member for controlling the conductivity thereof, direct current switching means for connecting said electric valve means to said direct current circuit, a source of current for energizing said control members to render said electric valve means conductive, and means responsive to a predetermined electrical condition of one of said first mentioned circuits for impressing on said control members a hold-off voltage and for disconnecting said source from said control members.

9. In combination, an alternating current supply circuit, a direct current load circuit, electric translating apparatus comprising a plurality of electric valve means each constituting a rectifier unit for transmitting power to said direct current circuit and each having at least one control member for controlling the conductivity thereof, alternating current switching means for connecting said translating apparatus to said supply circuit, direct current switching means for connecting said electric valve means to said direct current circuit, a source of current for energizing said control members, means responsive to a predetermined electrical condition of said direct current circuit for opening substantially simultaneously said direct current switching means and disconnecting said source of current from said control members.

10. In combination, an alternating current circuit, a direct current circuit, electric translating apparatus comprising a plurality of electric valve means each having at least one control member for controlling the conductivity thereof, direct current switching means for connecting said electric valve means to said direct current circuit, a source of current for energizing said control members to render said electric valve means conductive, and means responsive to a predetermined electrical condition of said direct current circuit for opening said switching means and for disconnecting said source of current from said control members.

11. In combination, an alternating current supply circuit, a direct current load circuit, electric translating apparatus comprising a plurality of electric valve means each constituting a rectifier unit for transmitting power to said direct current circuit and each having at least one control member for controlling the conductivity thereof, alternating current switching means for connecting said translating apparatus to said supply circuit, a plurality of direct current switching means for connecting each of said electric valve means to said direct current circuit, a source of current for energizing said control members, means responsive to a predetermined electrical condition of one of said units for opening the associated direct current switching means, means for disconnecting said source from said control members, and means for reconnecting said source to said control members.

12. In combination, an alternating current circuit, a direct current circuit, electric translating apparatus comprising a plurality of electric valve means each having at least one control member for controlling the conductivity thereof, a plurality of direct current switching means each associated with a different one of said electric valve means to connect said electric valve means to said direct current circuit, a source of current for energizing said control members to render said electric valve means conductive, means responsive to a predetermined electrical condition of one of said electric valve means for opening the associated switching means, means for disconnecting said source from the control members, and means for reconnecting said source to said control members.

13. In combination, an alternating current circuit, a direct current circuit, electric translating apparatus comprising a plurality of electric valve means each having a control member for controlling the conductivity thereof, switching means for connecting said electric valve means in operative relation between said alternating current circuit and said direct current circuit, an excitation circuit comprising an auxiliary source of alternating current for energizing said control member to render said electric valve means conductive, means for impressing on said control member a biasing potential, and means responsive to the voltage of said auxiliary source for closing said switching means and for removing said biasing potential.

14. In combination, an alternating current circuit, a direct current circuit, electric translating apparatus connected between said circuits and comprising electric valve means of the controlled type comprising at least one control member for controlling the conductivity thereof, switching means for connecting said electric valve means in operative relation between said alternating current circuit and said direct current circuit, a source of negative unidirectional biasing potential, a control circuit for initiating the operation of said translating apparatus comprising means for impressing a biasing potential on said control member and subsequently effecting closure of said switching means, and means for removing said biasing potential.

15. In combination, an alternating current circuit, a direct current circuit, electric translating apparatus connected between said circuits and comprising electric valve means having control members for controlling the conductivity thereof, switching means for connecting said electric valve means in power transmitting relation between said circuits and comprising an actuating means, an excitation circuit for energizing said control members comprising a source of alternating current, a source of negative unidirectional biasing potential, a control circuit for initiating the operation of said translating apparatus comprising means for impressing said biasing potential on said control members and for subsequently energizing said actuating means, and means responsive to the voltage of said excitation circuit for preventing operation of said control circuit in the event said excitation circuit is not in condition for operation.

16. In combination, an alternating current circuit, a direct current circuit, electric translating apparatus connected between said circuits and comprising electric valve means having control members for controlling the conductivity thereof, switching means for connecting said electric valve means in power transmitting relation between said circuits and comprising an actuating means, a source of negative unidirectional biasing potential, an excitation circuit for impressing on said control members an alternating voltage, a control circuit for initiating operation of said translating apparatus and comprising means for connecting said source of biasing potential to said control members and means for energizing said actuating means, and means responsive to said biasing potential for controlling the energization of said actuating means.

17. In combination, an alternating current circuit, a direct current circuit, electric translating apparatus connected between said circuits and comprising electric valve means having control members for controlling the conductivity thereof, switching means for connecting said electric valve means in power transmitting relation between said circuits and comprising an actuating means, means for supplying a negative unidirectional biasing potential, a control circuit for initiating operation of said translating apparatus comprising means for impressing said biasing potential on said control members to maintain said electric valve means nonconductive until the closure of said switching means, and means for controlling the energization of said actuating means in response to said biasing potential.

18. In combination, an alternating current circuit, a direct current circuit, electric translating apparatus connected between said circuits and comprising electric valve means having control members for controlling the conductivity thereof, switching means for connecting said electric valve means in power transmitting relation between said circuits and comprising an actuating means, a relay responsive to current flow through said electric valve means in the forward direction, a source of negative unidirectional biasing potential, a relay responsive to reverse current conducted by said electric valve means for impressing said biasing potential on said control members, and means responsive to said relays for controlling the energization of said actuating means.

19. In combination, an alternating current circuit, a direct current circuit, electric translating apparatus connected between said circuits and comprising electric valve means of the controlled type having at least one control member for controlling the conductivity thereof, an excitation circuit for energizing said control member comprising a source of current, switching means for connecting said electric valve means in operative relation between said alternating current circuit and said direct current circuit, and means responsive to an electrical condition of said source for preventing operation of said switching means in the event said source is not in condition for operation.

20. In combination, an alternating current circuit, a direct current circuit, electric translating apparatus comprising an electric valve means having a control member for controlling the conductivity thereof, switching means for connecting said translating apparatus in operative relation between said alternating current circuit and said direct current circuit, an excitation circuit comprising an auxiliary source of alternating current for energizing said control member, and means responsive to the voltage of said auxiliary source for controlling the operation of said switching means.

21. In an electric power translating system including a plurality of electric valve means for effecting energization of a direct current load circuit from an alternating current supply circuit and each electric valve means including at least one control member for controlling the conductivity thereof, the method of initiating operation of said system which comprises energizing said control members to maintain said electric valve means nonconductive, subsequently connecting said electric valve means to said direct current circuit and controlling the energization of said control members to render said electric valve means conductive only after the electric valve means have been connected to said direct current circuit.

22. In an electric power translating system for energizing a direct current load circuit from an alternating current supply circuit through a plurality of electric valve means connected to operate in parallel and each having at least one control member for controlling the conductivity thereof, the method of protecting the system during an arc-back of one or more of the electric valve means which comprises impressing negative arc-suppressing voltages on the control members of the electric valve means which arc-back and subsequently disconnecting the electric valve means which have arced back from the direct current circuit and reducing the load transmitted by the normal electric valve means.

23. In an electric power translating system for energizing a direct current load circuit from an alternating current supply circuit through a plurality of electric valve means connected to operate in parallel and each having at least one control member for controlling the conductivity thereof, the method of protecting the system during an arc-back of one or more of the electric valve means which comprises impressing negative arc-suppressing voltages on the control members of the electric valves which arc-back, subsequently disconnecting the electric valve means which have arced back from the direct current circuit, reducing the load transmitted by the normal electric valve means, and lastly restoring the load transmitted by the normal electric valve means.

24. In combination, an alternating current circuit, a direct current circuit, electric translating apparatus for transmitting power between said circuits and comprising electric valve means having at lease one control member for controlling the conductivity thereof, switching means for connecting said electric valve means to said direct current circuit, hand operable means for initiating closure of said switching means, means responsive to said hand operable means for impressing a hold-off voltage on the control member prior to the closure of said switching means, means responsive to said hand operable means for closing said switching means, and means for removing said hold-off voltage upon release of said hand operable means.

25. In combination, an alternating current circuit, a direct current circuit, electric translating apparatus for transmitting power between said circuits and comprising electric valve means of the controlled type having at least one control member for controlling the conductivity thereof, switching means for connecting said electric valve means to said direct current circuit, control means for impressing on the control member a negative hold-off voltage, and means for initiating closure of said switching means, said control means operating in advance of said switching means to apply hold-off voltage before closure of said switching means.

26. In combination, an alternating current circuit, a direct current circuit, electric translating apparatus for transmitting power between said circuits and comprising electric valve means having at least one control member for controlling the conductivity thereof, alternating current switching means for connecting said translating apparatus to said alternating current circuit, direct current switching means for connecting said electric valve means to said direct current circuit, control means for impressing on the control member a negative hold-off voltage to maintain said electric valve means nonconductive, and initiating means for effecting closure of said direct current switching means, said control means operating in advance of said switching means to apply hold-off voltage before closure of said switching means.

27. In combination, an alternating current supply circuit, a direct current load circuit, electric translating apparatus connected between said circuits and comprising a plurality of electric valve means each constituting a rectifier for transmitting power to said direct current circuit and each having at least one control member for controlling the conductivity thereof, a plurality of switching means each associated with a different one of said electric valve means for connecting the associated electric valve means to said direct current circuit, means responsive to the reverse current conducted by said electric valve means for selectively rendering nonconductive that electric valve means which arcs back, means for disconnecting the electric valve means from said direct current circuit, and means for energizing the control members of the normal electric valve means to cause said normal electric valve means to drop load.

28. In combination, an alternating current supply circuit, a direct current load circuit, electric translating apparatus connected between said circuits and comprising a plurality of electric valve means each constituting a rectifier for transmitting power to said direct current circuit and each having at least one control member for controlling the conductivity thereof, a plurality of switching means each associated with a different one of said electric valve means for connecting the associated electric valve means to said direct current circuit, means responsive to the reverse current conducted by said electric valve means for selectively rendering nonconductive that electric valve means which arcs back, means for disconnecting the electric valve means from said direct current circuit, means for temporarily causing the normal electric valve means to drop load, and means for causing the normal electric valve means to assume load within a predetermined interval of time.

29. In combination, an alternating current circuit, a direct current circuit, electric translating apparatus connected between said circuits and comprising an electric valve means of the type employing an ionizable medium and comprising at least one anode, a cathode, a holding anode, and an arc initiating electrode, actuating means for said electrode, means for energizing said actuating means to move said electrode into engagement with said cathode when said medium is nonionized, means for supplying energizing current to said electrode, means for deenergizing said actuating means, means for deenergizing said electrode after the initiation of an arc discharge within said electric valve means, and means for deenergizing said holding anode.

30. In combination, an alternating current circuit, a direct current circuit, electric translating apparatus connected between said circuits and comprising electric valve means of the type employing an ionizable medium and comprising at least one anode, a mercury pool cathode, a holding anode and an arc initiating electrode biased away from said cathode, actuating means for moving said electrode into engagement with said cathode, means for energizing said actuating means to move said electrode into engagement with said cathode in accordance with the current conducted by said holding anode and to effect deenergization of said electrode after current begins to flow between said holding anode and said cathode, and means for deenergizing said holding anode in response to current conducted by said electric valve means.

31. In combination, an alternating current circuit, a direct current circuit, electric translating apparatus connected between said circuits and comprising electric valve means comprising at least one anode, a cathode, a holding anode and a control grid, means for supplying current to said holding anode, a source of current for energizing said control grid, and means for permitting connection of said source to said control grid only when current is transmitted between said holding anode and said cathode.

32. In combination, an alternating current circuit, a direct current circuit, electric translating apparatus connected between said circuits and comprising a plurality of electric valve means, each electric valve means comprising at least one anode, a cathode, a holding anode and at least one control grid, means for transmitting current to the holding anode, a source of current for energizing said control grid to cause said electric valve means to conduct current, switching means for connecting said source to said control grid, and a plurality of individual means each associated with a different one of said electric valve means and each responsive to the holding current transmitted by the associated holding anode to permit closure of said switching means only when current is conducted between the respective holding anodes and the associated cathodes.

33. In combination, an alternating current circuit, a direct current circuit, electric translating apparatus connected between said circuits and comprising a plurality of electric valve means, each of said electric valve means including at least one anode, a cathode, a holding anode and at least one control grid, a plurality of switching means each connected between a different one of of said electric valve means and said direct current circuit, a plurality of current responsive means each associated with the holding anode of a different one of said electric valve means, a source of current for energizing the grids to cause said electric valve means to conduct current, connecting means for connecting said source to said grids, means responsive to all the current responsive means for controlling the connecting means, and interlocking means connected between each of said switching means and the associated current responsive means to render the latter ineffective when said switching means is in the open circuit position.

34. In combination, an alternating current circuit, a direct current circuit, a plurality of electric valve means each connected between said circuits for transmitting power therebetween and each comprising at least one control member for controlling the current conducted thereby, a plurality of circuit interrupting means each connected in series relation with a different one of said electric valve means and each comprising operating means responsive to the current conducted thereby, each of said operating means being arranged to open the associated circuit interrupting means when the associated electric valve means arcs-back, a plurality of control circuits each associated with a different one of said electric valve means for energizing the associated control member, and a plurality of current responsive means each connected in series relation with the associated electric valve means for modifying the action of the associated control circuit to reduce the current conducted by the associated electric valve means when the current tends to exceed a predetermined value, said control circuits and said current responsive means serving to reduce the current conducted by the normal electric valve means when one electric valve means is subjected to an arc-back condition.

35. In combination, an alternating current circuit, a direct current circuit, a plurality of electric valve means each connected between said circuits and each having at least one control member for controlling the current conducted thereby, a plurality of circuit interrupting means each connected in series relation with a different one of said electric valve means and each having an operating means, a plurality of current responsive means each associated with a different one of said electric valve means for energizing the operating means of the associated circuit interrupting means, a plurality of control circuits each associated with a different one of said electric valve means for energizing the associated control member, and a plurality of individual means each associated with a different one of said electric valve means and each responsive to both overload current and arc-back current for modifying the action of the associated control circuit to reduce the current conducted by the associated electric valve means, the current responsive means and the control circuits effecting a reduction in the current conducted by all of the electric valve means when one electric valve means is subjected to an arc-back condition.

36. In combination, an alternating current supply circuit, a direct current load circuit, electric translating apparatus connected between said circuits and comprising a plurality of electric valve means for transmitting power between said circuits, a plurality of individual direct current switching means for connecting said electric valve means to said direct current circuit, means selectively responsive during reversal of power flow in said electric valve means due to an arc-back in one of the electric valve means to reduce the load transmitted by all the electric valve means, means for opening the direct current switching means connected to the electric valve means which arcs back, and means for automatically effecting reapplication of load to the electric valve means not subjected to the arc-back a predetermined interval of time after the occurrence of reversal of power flow.

37. In combination, an alternating current supply circuit, a direct current load circuit, electric translating apparatus connected between said circuits and comprising a plurality of electric valve means for transmitting power in parallel relationship between said circuits, a plurality of individual switching means for connecting said electric valve means in operative relation between said supply circuit and said load circuit, means selectively responsive to a fault condition of said electric valve means to reduce the load transmitted by all the electric valve means, means for opening the switching means associated with the electric valve means subjected to a fault, and means for automatically effecting reapplication of load to the electric valve means not subjected to the fault.

38. In combination, a supply circuit, a load circuit, electric translating apparatus connected between said circuits and comprising a plurality of translating units for transmitting power in parallel relationship between said circuits, a plurality of individual switching means each associated with a different one of said translating units for connecting said units in operative relationship between said supply circuit and said load circuit, means selectively responsive to the occurrence of a fault condition of said translating units to reduce temporarily the load transmitted by all the translating units, means for opening the switching means connected to that translating unit on which the fault occurs, and means for automatically effecting reapplication of load to the translating units not subjected to the fault condition.

39. In combination, a supply circuit, a load circuit, electric translating apparatus connected between said circuits and comprising a plurality of translating units for transmitting power in parallel relationship between said circuits, a plurality of individual switching means each associated with a different one of said translating units for connecting said units in operative relationship between said supply circuit and said load circuit, means selectively responsive to the occurrence of a fault condition of said translating units to reduce temporarily the load transmitted by all the translating units, means for opening the switching means connected to that translating unit on which the fault occurs, and means responsive to the operation of the switching means associated with the faulty unit for effecting reapplication of load to the normal translating units.

40. In combination, an alternating current supply circuit, a direct current load circuit, electric translating apparatus connected between said circuits and comprising a plurality of electric valve means for transmitting power in parallel relationship between said circuits and each having at least one control member for controlling the conductivity thereof, a plurality of individual switching means for connecting said electric valve means to said direct current circuit, means for impressing on the control members of all the electric valve means a voltage to reduce the load transmitted by all the electric valve means, means for opening the switching means connected to the electric valve means which have been subjected to a fault condition, and means responsive to the operation of the switching means associated with the faulty electric valve means for controlling the energization of the control member of the other electric valve means to effect reapplication of load to the normal electric valve means.

41. In an electric translating system, an alternating current circuit, a direct current circuit, a first current converter for connecting said alternating current circuit with said direct current circuit comprising a plurality of electric valves operating during predetermined periods, a first switch for controlling the flow of current through said converter, means for rendering said valves conductive, a second current converter connected in parallel with said first converter and comprising a second plurality of electric valves operating during periods different from the first said periods, a second switch for controlling the flow of current through said second converter, means for rendering the second said valves conductive, and means for initiating the operation of said converters comprising means for causing closure of the first and second said switches and for thereafter causing the first and second said means to become operative simultaneously.

42. In an electric translating system, an alternating current circuit, a direct current circuit, a first current converter for connecting said alternating current circuit with said direct current circuit comprising a plurality of electric valves operating during predetermined periods, means for rendering said valves conductive, a second current converter connected in parallel with said first converter and comprising a second plurality of electric valves operating during periods different from the first said periods, means for rendering the second said valves conductive, and means for initiating the operation of said converters comprising means for causing the first and second said means to become operative simultaneously.

43. The method of initiating the flow of current simultaneously through a plurality of parallel electric current converters of the electric valve type comprising the steps of closing the circuits of said converters and of thereafter rendering a valve of each converter simultaneously conductive.

44. The method of controlling the flow of current through a plurality of parallel electric current converters of the electric valve type comprising the steps of simultaneously opening the circuits of said converters, rendering the valves of the different converters non-conductive, reclosing the circuits of said converters while said valves are maintained non-conductive, and rendering a valve of each converter simultaneously conductive.

DANIEL C. HOFFMANN.
EUGENE H. REID.
HERMAN BANY.